United States Patent [19]
Fisher

[11] Patent Number: 5,932,666
[45] Date of Patent: Aug. 3, 1999

[54] LOW PROFILE ADDITIVES FOR POLYESTER RESIN SYSTEMS BASED ON ASYMMETRIC GLYCOLS AND AROMATIC DIACIDS

[75] Inventor: Dennis Herbert Fisher, Westerville, Ohio

[73] Assignee: Ashland Inc., Russell, Ky.

[21] Appl. No.: 09/047,754

[22] Filed: Mar. 25, 1998

Related U.S. Application Data

[63] Continuation of application No. 08/595,538, Feb. 2, 1996, Pat. No. 5,756,554.

[51] Int. Cl.$^6$ .................. C08G 63/91; C08G 63/183; C08J 11/24
[52] U.S. Cl. .................. 525/438; 525/444; 521/48.5; 528/297; 528/302
[58] Field of Search .................. 525/438, 444; 521/48.5; 528/302, 297

[56] References Cited

U.S. PATENT DOCUMENTS

| | | |
|---|---|---|
| 3,231,634 | 1/1966 | Wismer . |
| 3,257,335 | 6/1966 | Whitfield . |
| 3,344,091 | 9/1967 | Russin . |
| 3,427,267 | 2/1969 | Stieger . |
| 3,549,586 | 12/1970 | Smith . |
| 3,668,178 | 6/1972 | Comstock . |
| 3,701,748 | 10/1972 | Krochel . |
| 3,736,278 | 5/1973 | Wada . |
| 3,884,850 | 5/1975 | Ostrowski . |
| 3,909,483 | 9/1975 | Hindersinn . |
| 3,929,868 | 12/1975 | Dombroski . |
| 3,994,853 | 11/1976 | Hindersinn . |
| 4,035,439 | 7/1977 | Stevenson . |
| 4,054,561 | 10/1977 | Strauss . |
| 4,172,056 | 10/1979 | Atkins . |
| 4,172,102 | 10/1979 | Hoene . |
| 4,622,354 | 11/1986 | Iselev . |
| 4,673,706 | 6/1987 | Atkins . |
| 5,116,917 | 5/1992 | Chang . |

FOREIGN PATENT DOCUMENTS

| | | |
|---|---|---|
| 0335406 | 10/1989 | European Pat. Off. . |
| 60248772 | 12/1985 | Japan . |

OTHER PUBLICATIONS

W. Krolikowski & M Pawlak, "The Shrinkage Compensation Mechanism in Low Profile U.S Resin Systems" Translated from Kunsstoffe 73 (1983) 1, pp. 42–47.

Atkins et al, "Mechanism of Low Profile Behavior Influence of Thermoplastic Physical Properties on Performance in Poleptive Molding" 31st Annual Technical Conference 1976 Reinforced Plastics/Composites Institute. The Society of Plastics Ind. Inc., Sec. 2–E pp. 1–9.

Encyclopedia of Chemical Technology, Third Edition, vol. 18, pp. 570, 591, 592, 593, Wiley Interscience Publication, NY 1982.

*Primary Examiner*—Patricia A. Short
*Attorney, Agent, or Firm*—Mary E. Picken; Martin Connaughton

[57] ABSTRACT

This invention is a thermoplastic saturated polyester low profile additive (low profile additive) useful in sheet molding compounds for parts, especially vehicle parts. The additive has a major component derived from aromatic compounds such as terephthalic acid including recycled polyethylene terephthalate. Asymmetrical glycols are an important ingredient and can be used to digest recycled PET to make oligomeric glycols which are reacted with acids having fewer than 12 carbon atoms to make one of the low profile additives of this invention.

2 Claims, No Drawings

LOW PROFILE ADDITIVES FOR POLYESTER RESIN SYSTEMS BASED ON ASYMMETRIC GLYCOLS AND AROMATIC DIACIDS

This application is a continuation of application Ser. No. 08/595,538 filed on Feb. 2, 1996, now U.S. Pat. No. 5,756,554.

This invention relates to thermoplastic saturated polyester low profile additives for use with unsaturated polyesters and unsaturated monomers to make molded parts, especially vehicle parts. These low profile additives are made by reacting saturated diacids having a major portion of aromatic diacids with glycols, a portion of which are asymmetrical glycols. In one aspect of this invention the aromatic diacid containing reactant is obtained by glycolysis of ground polyethylene terephthalate using an asymmetrical glycol forming a low molecular weight oligomeric glycol.

BACKGROUND OF THE INVENTION

The use of plastic materials, such as fiberglass-reinforced thermosetting polyester resins for exterior auto and truck parts, has steadily increased. These cured resin materials have been successful because they are strong, heat resistant and enable molders to form one plastic part instead of several metal parts. By their very nature, however, thermosetting composites are difficult to mold without seriously compromising the surface cosmetics of the finished part. As consumers demand better quality, material suppliers and molders have worked to continuously improve the surface smoothness and dimensional stability of composite parts.

A number of thermoplastic polymer additives are used to improve surface quality of molded thermosetting plastic parts. These materials are called low profile additives because they decrease surface roughness and improve surface smoothness or "profile" by reducing the shrinkage of the thermosetting resin as a part is cured during molding. When significant cure shrinkage occurs, a cross section of the surface appears rough under high magnification showing large peaks and valleys. When cure shrinkage is reduced, the surface is smoother, and its cross section appears smoother, having lower peaks and shallower valleys. The objective of an effective low profile additive is to reduce the difference between the highest peaks and shallowest valleys to a minimum. Even the best low profile additives, however, do not achieve a mirror-like surface.

Examples of thermoplastic polymers used as low profile additives to control reaction shrinkage and improve the surface smoothness when curing unsaturated polyester resins and vinyl ester resins include polystyrene, polyesters, polymethylmethacrylate, polyvinyl acetate, polyurethanes, polyglycols, and their various copolymers.

U.S. Pat. No. 3,959,209 Koppers, lists polymeric thermoplastics which reduce the shrinkage of thermosetting resin formulations as they are cured and thus effectively produce articles having smooth, high quality cosmetic surfaces. Listed in 3,959,209 are homopolymers of ethylene, styrene, vinyl toluene, alkyl methacrylates, alkyl acrylates, various copolymers of vinyl chloride and vinyl acetate, styrene and acrylonitrile, methyl methacrylate and alkyl esters of acrylic acid, methyl methacrylate and styrene, methyl methacrylate, and acrylamide.

Thermoplastic low profile additives can sometimes improve other properties of thermoset molding compounds. U.S. Pat. No. 4,421,894 Olin describes a polyurethane oligomer modifier for incorporation into thermosetting polyester resin formulations which imparts improved impact properties to the often brittle thermoset resins in addition to reducing shrinkage during curing.

In the Kunststoffe 1983 publication, Krolikowski ranked various thermoplastic additives according to increasing shrinkage values of the corresponding modified unsaturated polyester resin systems: high density polyethylene, vinyl acetate copolymer with diallyl phthalate, polycaprolactone, polystyrene, polymethylmethacrylate, polyhydroxyester, and styrene copolymer with diallyl phthalate.

U.S. Pat. No. 5,116,917 Ashland Oil describes a saturated polyester low profile additive for vinyl ester resin systems made from dibasic acid and an ethylene oxide/propylene oxide polyether polyol having an ethylene oxide/propylene oxide molar ratio ranging from 0.1 to 0.9.

Among the more versatile low profile additives are thermoplastic polyesters. This versatility is due to the wide variety of polyester copolymers that can easily be prepared, thus polyester low profile additives can be custom designed for a particular function in the unsaturated base resin of interest. Most Most polyester low profile additives are made from aliphatic dibasic acids or anhydrides such as glutaric, adipic, sebacic or azeleic, and glycols based on ethylene oxide or propylene oxide. These low profile additives are usually easy to prepare and formulate, have good compatibility in styrene and base resins, and show excellent shrinkage control which produces a high quality cosmetic surface.

While less common, when mechanical properties are critical, low profile additives are also prepared from aromatic dibasic acids or anhydrides such as phthalic, isophthalic and terephthalic, and glycols or lactones. Such polyesters are often more difficult to prepare, less soluble in styrene, less compatible in other polyesters, and typically show more cure shrinkage and reduced surface smoothness. However, they are usually tougher, with higher glass transition temperatures and melting points, and are more resistant to transesterification. This toughness yields increased mechanical properties for composite parts, especially at elevated temperatures. As molding formulations are often premixed and stored prior to use, the possibility of transesterification between the low profile additive and base resin always exists. This transesterification results in a drop in the effective concentration of low profile additive, a loss in shrinkage control, and reduced surface smoothness. It would be most desirable to identify and prepare low profile additives from aromatic diacids which would produce composite molding formulations with superior resistance to transesterfication, increased mechanical properties, and excellent surface smoothness.

To this end, the low profile additives of this invention are prepared primarily from isophthalic and terephthalic acid and a variety of symmetrical and asymmetrical dihydric alcohols or glycols. These evaluations have lead to the following conclusions:

Resistance to transesterification is primarily a function of the aromatic diacids content and is approximately proportional to the molar ratio of aromatic to aliphatic diacids. Resistance is best when there is a major portion of aromatic diacids.

For polymers with high aromatic diacid content:
compatibility in styrene and unsaturated base resins and effectiveness at reducing cure shrinkage and improving surface smoothness is mainly a function of the variety and structure of glycols used and the number average molecular weight (Mn) of the polymer,
mixtures of glycols containing a substantial amount of asymmetrical materials, such as propylene, dipropylene, polypropylene, and 2-methyl 1,3-propanediol show increased effectiveness when used to prepare low profile additives, low profile additives prepared using glycol mixtures with substantial quantities of 2-methyl 1,3-propanediol are effective in a wider variety of base resins than other asymmetrical glycols, for equal low profile additive concentrations, the mechanical properties of the composite increase as the mechanical properties of the low profile additive increase.

SUMMARY OF THE INVENTION

This invention is a resin composition useful for forming cured, molded articles such as automobile parts comprising a thermoset unsaturated polyester resin, one or more olefinically unsaturated monomers copolymerizable with said unsaturated polyester, and a saturated thermoplastic low profile additive which is compatible with the uncured resin molding formulation and becomes insoluble or incompatible during the curing reaction of the unsaturated polyester and monomer. The additive of this invention has a number average molecular weight (Mn) between 3,000 and 20,000. Such molecular weights may be reached by esterification or esterification followed by linking the polyesters through their terminal acid or hydroxyl end groups with multifunctional epoxides or isocyanates.

The thermoplastic low profile additive component of this invention is made by esterifying, or cooking, dicarboxylic acids or their anhydrides with glycol. Cooking may also be followed by linking the polyesters through their terminal hydroxyl or acid end groups with multifunctional isocyanates or epoxides to adjust the number average molecular weight. Such methods are well known by those skilled in the art of polyester technology. Typical reactants include diacids such as adipic acid, phthalic acid (anhydride), isophthalic acid and terephthalic acid, and glycols such as ethylene, diethylene, propylene, and dipropylene glycols, 2-methyl 1,3-propanediol, 1,4-butanediol and hexanediol.

Useful linking molecules include polyepoxides such as the glycidyl ethers of bisphenol A, phenol-formaldehyde novolaks, aliphatic fatty acids and esters, glycols and polyether glycols, polyamines and cyclohexenes which yield cycloaliphatic epoxides. Polyisocyanates such as toluene diisocyanate (TDI) and methylene di-para-phenylene isocyanate (MDI), are well known and useful.

The preferred epoxy linking compound is the diglycidyl ether of bisphenol A [4,4'- (1-methylethylidene) bisphenol polymer with chloromethyl oxirane [CAS #25068-38-6]. Polyester oligomers can easily be joined with polyepoxides by nucleophilic addition if they are terminated by a nucleophilic functional group, such an acid, or any group that could be reacted to yield an acid.

If nucleophilic addition with epoxide proves difficult, the polyester can be cooked to yield hydroxyl terminal groups. Such an oligomer is easily linked using a multifunctional isocyanate such as TDI or MDI to form a polyurethane.

The multifunctional epoxide or isocyanate linking moiety would usually be less than 15 weight percent of the final low profile additive product; preferably it would be less than 10 weight percent; and most preferably it would be less than 5 weight percent. The Mn of a polyester prepolymer suitable for this invention typically averages 1000 to 9000, and the Mn of the final low profile additive produced is 3,000 to 20,000, and preferably between 6000 and 16,000.

The low profile additive of this invention is incorporated into thermosetting molding formulations to control shrinkage during cure. The thermosetting resins used may include conventional unsaturated polyesters, vinyl esters, and hybrid unsaturated polyesters which contain epoxy or urethane linkages. The low profile additive may be used in any effective proportion. Preferably, the low profile additive is added in a proportion ranging from about 5 to about 30 parts by weight per 100 parts by weight of unsaturated polyester resin plus copolymerizable solvent. Most preferably, the additive comprises about 8 to about 20 parts by weight per 100 parts by weight of the polyester resin plus copolymerizable solvent.

The thermosetting unsaturated polyester resins are prepared by reacting dicarboxylic acids or their anhydrides with glycols, using methods and reactants well known in the polyester art. Typical reactants include diacids and anhydrides such as phthalic acid, phthalic anhydride, maleic acid, maleic anhydride, and glycols, such as ethylene glycol, diethylene glycol, propylene glycol, butanediol and hexanediol. The formed polyesters and the additives are diluted for use by dissolving them in reactive copolymerizable solvents. Such copolymerizable solvents include ethylenically unsaturated compounds such as styrene, vinyl toluene, methacrylic esters, acrylic esters, divinyl benzene, various multi-functional acrylates and methacrylates and diallyphthalate.

The polymerization and curing of the additive containing polyester resin system is effected using well-known procedures, preferably in the presence of a polymerization catalyst. Curing temperature is dependent on the particular catalyst used. Commonly used catalysts are free radical generating catalysts such as peroxide or azo type compounds. Typical peroxy catalysts are organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, and t-butyl peroctoate. Typical azo compounds are azobis-isobutyronitrile, 2-t-butylazo-2-cyano4-methylpentane, and 4-5-butylazo-4-cyano-valeric acid. The preferred catalyst is t-butyl perbenzoate. The catalyst generally is used in an amount from about 0.1 to about 10 parts by weight per 100 parts by weight of thermoset resin, reactive solvent and low profile additive.

The composition of the present invention may also contain other standard ingredients, such as fillers (e.g., finely divided solids include $CaCO_3$, clay, alumina, talc or glass microspheres) and reinforcement materials (e.g., chopped fiber glass, carbon fibers, asbestos fibers or boron nitride whiskers). Other ingredients may include internal mold release agents, such as calcium, zinc, magnesium, or sodium stearate. Pigments, dyes, stabilizers and viscosity modifiers (e.g., Group II metal oxides and hydroxides, such as magnesium oxide) may be added. Other low shrink or impact additives also may be included. A typical formulation generally contains reinforcement materials in an amount ranging from about 20 to about 300 parts by weight per 100 parts by weight of the polyester resin, copolymerizable solvent, plus low profile additive oligomer and from about 50 to about 1,000 parts by weight of fillers.

DETAILED DESCRIPTION OF THE INVENTION

In one aspect this invention is a saturated polyester low profile additive made using a major portion of saturated aromatic diacid, a minor portion of saturated aliphatic diacid and a glycol mixture containing linear and asymmetrical glycols. The polyester may be further linked with epoxy or isocyanate compounds.

In another aspect this invention is a saturated polyester low profile additive made using an asymmetrical glycol and saturated aliphatic acid to glycolize and digest ground recycled polyethylene terephthalate polymer. This polyester can also be linked with multifunctional epoxy or isocyanate compounds. This second polyester contains about 50 percent recycle content.

In this invention the asymmetrical glycols are those as:

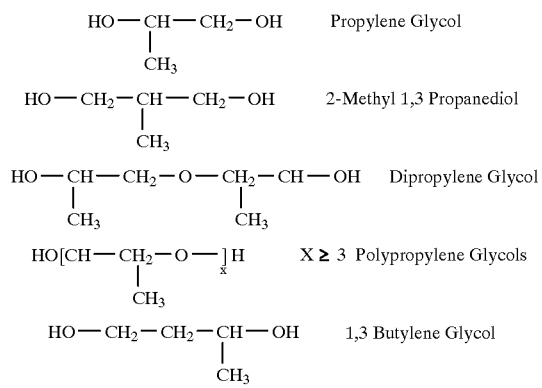

The most preferred asymmetrical glycol is 2-methyl 1,3 Propanediol.

The symmetrical glycols are those such as:

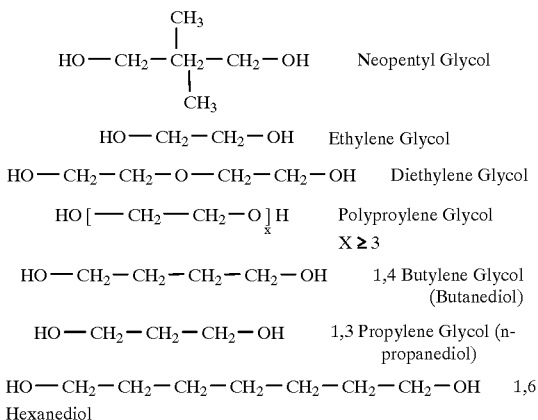

In another aspect this invention is a low profile additive having a major portion of an aromatic compound which is an oligomer obtained from ground recycled polyethylene terephthalate (PET). Because automobile manufacturers desire that molding formulations for car parts have at least 25 percent recycle content, ingredients used to make parts should each contribute to that recycle level. Use of recycle PET to make one of the low profile additives of this invention provides a low profile additive with approximately 50 percent recycle content.

Recycle ground polyethylene terephthalate polymer is obtained from various sources in the form of film, bottles and chunks. One source is Resin Management, Tampa, Fla.

U.S. Pat. No. 4,054,561 Owens Corning used dimer and trimer acids having more than 12 carbon atoms with recycled terephthalate oligomers from PET and symmetrical glycols to make additives providing moderate shrinkage control and poor surface quality of the molded parts. The high molecular weight of dimer/trimer acids also reduces the recycle content of the low profile additive to unacceptable levels.

It has been discovered that acceptable low profile characteristics can be attained using various glycols to digest the PET while using low molecular weight acids to react with the recycled terephthalate oligomers to make the saturated polyester low profile additives of this invention. Smaller acids produce superior surface quality and acceptable levels of recycle content.

The following Examples describe the preparation and evaluation of the low profile additives of this invention and the low profile additive of the U.S. Pat. No. 4,054,561 patent. All parts are by weight and all units are in the metric system unless otherwise specified. All references mentioned herein are specifically incorporated by reference.

LOW PROFILE ADDITIVE #1: LINKED WITH EPOXY

The following raw materials were charged to a four-liter resin kettle:

Isophthalic acid 1614.0 g (9.7 moles)
Adipic acid 157.7 g (1.08 moles)
2-methyl 1,3-propanediol 583.5 g
Diethylene glycol 286.9 g
Ethylene glycol 73.8 g
Polyethylene glycol 400 172.0 g The mixture was heated slowly to 225° C., removing $H_2O$ and held for 15 to 16 hours until the acid value was 26.8 and hydroxyl value was about 4. The temperature was reduced to 171° C. and about 130 grams EPON 828 epoxy resin (Shell Chemical Co.) and 2.8 grams tetrabutylphosphonium acetate (70% NV in methanol)[Johnson Matthey, Alfa Aesar, Ward Hill, Mass. 01835-0747; product code: 56179] were charged. After about 50 minutes at 170° C., the acid value was reduced to 10.0. About 2600 g of polymer product was cut to 50% nonvolatiles in styrene and inhibited with 200 ppm tert-butyl catechol. The number average molecular weight (Mn) of the polyester low profile additive, measured by end group analyses, was about 8000.

LOW PROFILE ADDITIVE #2: NOT LINKED WITH EPOXY

The following raw materials were charged to a three-liter resin kettle:

Isophthalic acid 1317.6 g (7.9 moles)
Adipic acid 128.8 g (0.9 moles)
2-methyl 1,3-propanediol 471.5 g
Diethylene glycol 231.8 g
Ethylene glycol 59.6 g
Polyethylene glycol 400 139.0 g
Fascat 4100 catalyst 2.0 g The mixture was heated slowly to 225° C., removing $H_2O$ and held for about 9 hours until the acid value was 39 and 1 g of Fascat 4100 catalyst (M&T Chemical, Rahway, N.J.) was added. At 15 hours and an acid value of about 31, 1 g of Fascat catalyst was again added. After no significant change in acid value in 3 hours, the hydroxyl value was checked and found to be about 2. The temperature was reduced and about 35 g of the glycol mixture in the initial charge was added. The acid value was reduced to 12.3 over the next 9 hours. About 2000 g of polymer product was cut to 50% nonvolatiles in styrene and inhibited with 200 ppm tert-butyl catechol. The number average molecular weight (Mn) of the polyester low profile additive, measured by end group analyses, was about 7400.

LOW PROFILE ADDITIVE #3: USING ASYMMETRICAL GLYCOL

An attempt was made to prepare a third low profile additive with the substitution of 1-methyl 1,3 propanediol (1,3-butylene glycol) for the 2-methyl 1,3 propanediol in low profile additive #1. The cook went smoothly until an acid value of about 37 was reached and the reaction appeared to stop. A check of the hydroxyl value showed about 13, which should have been sufficient for continued polymerization. Attempts to force the reaction by using catalyst and increasing the temperature to 235° C., however, were unsuccessful, and additional "cooking" only caused polymer degradation and an increase in the acid value. The preparation was stopped and the unfinished polymer discarded.

LOW PROFILE ADDITIVE #4: USING SYMMETRICAL GLYCOLS

A high recycle containing low profile additive was prepared from the glycolysis product of diethylene glycol (a symmetrical glycol) and polyethylene terephthalate (PET) and adipic acid as follows. PET and 900 g diethylene glycol (1/0.8 molar ratio) were heated and held at 220° C. for 4 hours.

The glycolized PET and 424 g adipic acid were charged to a 2-liter resin kettle and heated slowly to about 226° C. as water was removed. An acid value of 21.2 and a hydroxyl value of about 13 was reached after 6 hours. About 19 g of adipic acid was added and an additional 6 hours reduced the acid value to 25.0 and the hydroxyl value to 3 to 4. The reactor was cooled to 185° C. and 57.9 g of Epon 828 epoxy resin and 0.98 g of tetrabutylphosphonium bromide catalyst were charged. The acid value was reduced to 7.8 in about an hour. The 1250 g of polymer was cut to 50% nonvolatiles with styrene inhibited with 200 ppm of t-butyl catechol. The number average molecular weight (Mn) of the product, based on end group analyses, was about 9930.

LOW PROFILE ADDITIVE #5: USING ASYMMETRICAL GLYCOLS

A high recycle containing low profile additive was prepared from the glycolysis product of 2-methyl 1,3-propanediol and polyethylene terephthalate (PET) and adipic acid as follows:

PET 1361.7 g 2-methyl 1,3-propanediol 638.3 g

Adipic acid 1035.4 g

The PET and glycol were charged to a 4-liter resin kettle, heated and held between 220° C. and 222° C. for about 4 hours. The product was a soft well digested paste when cold. The adipic acid and Antifoam A were charged, and the temperature were raised to 225° C. as water was removed. When the acid value had been reduced to 24.5 and the hydroxyl was 2–3, the reactor was cooled to 180° C. At this point, 133 g Epon 828 epoxy resin and 2.04 g of tetrabutylphosphonium bromide was charged. The acid value was reduced to 10.0 in about 45 minutes. The 2850 g of polymer was cut to 50% nonvolatiles with styrene inhibited with 200 ppm of t-butyl cathecol. The Mn of the product, based on end group analyses, was about 8980.

LOW PROFILE ADDITIVE #6: USING SYMMETRICAL GLYCOLS

The following raw materials were charged to a four-liter resin kettle:

Isophthalic acid 1632.7 g

Adipic acid 152.3 g

Neopentyl glycol (NPG) 650.5 g

Diethylene glycol (DEG) 276.8 g

Ethylene glycol 71.3 g

Polyethylene glycol 400 166.8 g

The mixture was heated slowly to 225° C., removing $H_2O$ and after holding for 15 to 16 hours, 1.2 g of Fascat 4100 catalyst (M&T Chemicals, Rahway, N.J.) was charged. Analysis showed the acid value was 43.1 and hydroxyl value was about 13.6, so about 12 g of NPG and 8 g DEG was charged. The cook stalled at an acid value of 34.6. Analysis showed the hydroxyl number to be about zero. This time the nitrogen flow was shut off and 21 g NPG and 11 g DEG was charged. In about 8 hours, the acid value dropped to 25.4 The temperature was reduced to about 160° C. and about 113 grams EPON 828 epoxy resin (Shell Chemical Co.) and 2.7 grams tetrabutylphosphonium acetate were charged. After about 65 minutes at 165° C., the acid value was reduced to 8.5. About 2600 g of polymer product was cut to 50% nonvolatiles in styrene and inhibited with 200 ppm tert-butyl catechol. The number average molecular weight (Mn) of the polyester low profile additive, measured by end group analyses, was about 8950.

7. LOW PROFILE ADDITIVE #7: USING SYMMETRICAL GLYCOLS

Low profile additive #7 was prepared from recycled PET digested with a 60 mole percent diethylene glycol and 40 mole percent neopentyl glycol mixture replacing 2-methyl 1,3-propanediol. The charge to the 4-liter resin kettle was:

PET 1291.6 g

DEG 428.6 g

NPG 279.8 g

Adipic Acid 1004.0 g

Fascat 4100 2.5 g

The glycols and 960 grams of the PET were charged first. After the polymer had begun to melt into the glycol, remaining PET was charged. The pot temperature was set for 235° C., but began to boil vigorously at 225° C. About 2 ppm of Antifoam A eliminated the foaming. The PET was digested for about 4 hours and the adipic acid was added to repolymerize the PET. Water was removed as the kettle temperature was increased from 165° C. to 225° C. over an eight hour period. After six hours at 226° C., the [AV] was 37.8 and 1.25 grams of Fascat 4100 was charged. After nine hours at 226° C., the [AV] was 31.4 and the [OH] was 17.7. The [AV] and [OH] difference was adjusted with 24 grams adipic acid. The kettle was held at 226° C. for 6 hours, [AV]=28.9 and 1.2 g Fascat 4100 catalyst were charged. An additional 4 hours of cooking reduced the [AV] to 26.2. The kettle was cooled to about 175° C. and 108 grams of Epon 828 and 2.9 grams of 70% tetrabutylphosphonium acetate catalyst were charged. In about 75 minutes, the [AV] was reduced to 13.1 and about 2550 grams of polymer were cooled and cut to 50% nonvolatiles in inhibited styrene.

8. LOW PROFILE ADDITIVE #8 WITH TOLUENE DIISOCYANATE LINKING

The following raw materials were charged to a four-liter resin kettle to form the polymer precursor:

Isophthalic acid 2821.0 g

Adipic acid 275.3 g 2-methyl 1,3-propanediol 101 9.7 g

Diethylene glycol 501.4 g

Ethylene glycol 129.0 g

Polyethylene glycol 400 301.3 g

The mixture was heated slowly to 225° C., removing $H_2O$ and held for about 20 hours to an acid value of about 12.9 and hydroxyl value of about 14. About 800 g of the polymer was dissolved in 800 g of styrene using 0.28 g t-butyl catechol as an inhibitor. After adding 12.5 g of toluene diisocyanate, the mixture was warmed, under a nitrogen blanket, to≈70° C. About 1.6 g of dibutyl tin dilaurate was added as a catalyst and the mixture was held at temperature for ≈3 hours. About 3.7 g of 2-ethylhexanol was charged to insure all of the isocyanate had been consumed. Final analysis showed [AV]≈13, % nonvolatiles≈50.3, and viscosity (Brookfield, #2 spindle @ rpm)≈730 cps. A Mn (number average molecular weight) of 7500 was estimated by end group analysis.

9. LOW PROFILE ADDITIVE #9: SYMMETRICAL GLYCOL, NO EPOXY EXTENSION

The following raw materials were charged to a four-liter resin kettle:

Isophthalic acid 1633.0 g

Adipic acid 152.3 g

Neopentyl glycol (NPG) 651.0 g

Diethylene glycol (DEG 276.8 g

Ethylene glycol 71.2 g

Polyethylene glycol 400 166.8 g

The mixture was heated slowly to 225° C., removing $H_2O$ and after holding for 14 to 15 hours, analysis showed the acid value was 43.2 and hydroxyl value was about ≈27.5. About 19 g of NPG, 7 g of EG and 17 g DEG was charged. The "cook" slowed again at an acid value of 34.9. Analysis showed the hydroxyl number to be about ≈16. The nitrogen flow was reduced and 3 g EG, 7.2 g DEG and 8.1 g NPG was charged. As the acid value dropped slowly, 1.25 g of Fascat 4100 was charged and 225° C. was maintained. An additional 10 to 11 hours of "cooking" reduced the acid value to 12.4 and the cook was terminated. About 2500 g of polymer product was cut to 50% nonvolatiles in styrene and inhibited with 300 ppm tert-butyl catechol. The number average molecular weight (Mn) of the polyester LPA, measured by end group analyses, was about 7800.

The following Table 1 reports the result of comparing a low profile additive made using the asymmetrical glycol 2-methyl 1,3 propanediol which is further epoxy linked (LPA#1), a low profile additive made using 2-methyl 1,3 propanediol without epoxy extension (LPA#2), a low profile additive made with the symmetrical glycol neopentyl glycol which is further epoxy linked (LPA#6), a low profile additive made with the symmetrical glycol neopentyl glycol without epoxy extension (LPA#9), and a low profile additive made with the asymmetrical glycol 2-methyl 1,3 propanadiol further isocyanate linked (LPA#8).

TABLE 1

| Formulation | A | B | C | D | E |
|---|---|---|---|---|---|
| Q6585 | 65.0 | 65.0 | 65.0 | 65.0 | 65.0 |
| LPA #1[1] | 28.0 | — | — | — | — |
| LPA #2 | — | 28.0 | — | — | — |
| LPA #6[2] | — | — | 28.0 | — | — |
| LPA #8[3] | — | — | — | 28.0 | — |
| LPA #9 | — | — | — | — | 28.0 |
| Styrene | 7.0 | 7.0 | 7.0 | 7.0 | 7.0 |
| 12% cobalt naphthenate | 0.1 | 0.1 | 0.1 | 0.1 | 0.1 |
| BHT (butylated hydroxytoluene) | 0.1 | 0.1 | 0.1 | 0.1 | 0.1 |
| TBPB tertiary butyl perbenzoate | 1.5 | 1.5 | 1.5 | 1.5 | 1.5 |
| B-Side 33% MgO dispersion | 2.7 | 2.7 | 2.7 | 2.7 | 2.7 |
| Surface Quality, Ashland LORIA Index (Class A surfaces have an Ashland Index below 100) The Ashland LORIA equipment is described in U.S. Pat. No. 4,853,777. | 80 | 103, 103, 115 | 108 | 113 | 145 |

[1]Asymmetrical glycol and symmetrical glycol, epoxy extension
[2]Symmetrical glycols, epoxy extended
[3]Asymmetrical glycol and symmetrical glycol, isocyanate extended Formulation B shows good surface quality while Formulation A shows superior quality when the LPA is epoxy extended.

Formulation B is better than Formulation E made from a blend of solely symmetrical glycols.

The data in Table 1 show that, while good results were seen with neopentyl glycol and epoxy linking (LPA#6), better results were seen with 2-methyl 1,3 propanediol even without epoxy linking (LPA#2), the best results are obtained when both 2-methyl 1,3 propanediol and epoxy linking were used in the low profile additive of this invention. (LPA#1)

The following Table 2 reports a comparison of the performance of terephthalic acid-diethylene glycol (a symmetrical glycol) containing low profile additive (LPA#4) with the performance of terephthalic acid-2-methyl 1,3 propanediol (an asymmetrical glycol) low profile additive (LPA#5). Both low profile additives are epoxy linked to increase the molecular weight.

TABLE 2

LOW PROFILE ADDITIVES FROM RECYCLE PET

| Formulation | #1 | #2 |
|---|---|---|
| Q6585 | 65.0 | 65.0 |
| low profile additive #4 | 28.0 | — |
| low profile additive #5 | — | 28.0 |
| Styrene | 7.0 | 7.0 |
| $CaCO_3$ | 200 | 200 |
| 12% Cobalt Naphthanate | 0.1 | 0.1 |
| Butylated Hydroxytoluene | 0.1 | 0.1 |
| Tertiary Butylperbenzoate | 1.5 | 1.5 |
| B-Side, 33% MgO Dispersion | 2.7 | 2.7 |
| Surface Quality, Ashland Index | 86 | 75 |

The data in Table 2 show that Class A automotive surface quality measurements (below 100 Ashland surface quality index) were reached using a mixture of ethylene glycol and diethylene glycol (symmetrical glycols) to make low profile additive #4 and using a mixture of ethylene glycol and 2-methyl 1,3 propanediol to make LPA #5. Use of the asymmetrical 2-methyl 1,3 propanediol in low profile additive #5 provides a superior surface approaching the premium Class A measurement of 70. Both low profile additives made from oligomeric glycols derived from recycled PET make acceptable parts.

COMPARATIVE EXAMPLES WITH U.S. Pat. No. 4,054,561

A) Thermoplastic additives were prepared according to U.S. Pat. No. 4,056,561. PET oligomers and glycol monomers were prepared by reacting a mixture of recycle PET, ethylene glycol and diethylene glycol for about 3–4 hours at 230° C. Additional glycol were added to the oligomers to prepare a mixture which had a composition in the preferred ranges shown in the table between lines 45 and 55, column 2 of U.S. Pat. No. 4,054,561. Analysis of the mixture showed the hydroxyl number was about 550. The Empol 1018 dimer/trimer acid having an acid value of about 197 was used. Calculations showed to prepare a thermoplastic with acid value of about 30 and hydroxyl of about 5–10 require about 525 g oligomer and 1660 g dimer acid (weight ratio 3.16) which is within the range of 1.3–3.5 acid/glycols U.S. Pat. No. 4,054,561. The final product had an [AV] of about 26 and was soluble in styrene at 50% N.V. It was not soluble, however, in a standard formulation of PET modified base resin Ashland ENVIREZ 8030 resin containing 57.5, 32.0 of the additive at 50% NV and 10.5 g styrene per 100 g of formulated resin. This solution rapidly separated into a thin upper layer (~40%) and thicker lower layer ~60° in 1–1½ hours). Following standard procedures, filler, mold release, initiator, inhibitors, MgO thicken and glass were added to form sheet molding compound. The past was much thicker than usual, raising concerns about glass wet-out. The sheet thickened rapidly and was molded into 12×12 panels 2 days later at a paste viscosity of about 50 million centipoise. It was noted that some resin had separated and made the exposed glass on the edge of the sheet very sticky. The panel surface was dull and blistered and had a large amount of glass print. The panels were also somewhat warped and were unacceptable for use as automotive body panels. Quantitiative surface quality measurement was not possible because of surface roughness.

COMPARATIVE EXAMPLE B

A second thermoplastic additive was prepared according to U.S. Pat. No. 4,051,561 with a significantly lower ratio of dimer/trimer acid to glycol mixture. To accomplish this and maintain similar number average molecular weight and acid value for the product, it was necessary to adjust the glycol mixture to increase the oligomer content and reduce the hydroxyl number. The new glycol mixture was made by reacting a mixture of 613 g of oligomer from Example A ([OH]~550) with 387 g of recycle PET resin at 235° C. for 3½–4 hours. This yielded an oligomeric mixture having a hydroxyl value of about 325. Subsequently 436 g of oligomer were reacted with 842 g Empol 0108 dimer acid. Water was removed and the temperature was slowly raised to 225° C. until an [AV] of 28.0 was reached. The polymer formed was cut to 50% NV in inhibited styrene. (This mixture of polymer and styrene was very viscous, and paste-like at room temperature). As with comparative thermoplastic A, the standard formulation shown in Table 3 was mixed to prepare sheet molding compound in ASHLAND ENVIREZ 8030 base resin. Again, the thermoplastic additive was not soluble in the resin formulation, and the liquid resin separated into two approximately equal layers in 2–2½ hours. Filled paste using Thermoplastic B was about double in viscosity compared to a sample using low profile additive #4 (52,000 centipoise vs. 98,600 centipoise). Sheet prepared with Thermoplastic B was allowed to thicken until the paste viscosity had reached 55 million centipoise. It was then molded into 12×12 plaques at 1000 psi and 300° F. for 90 to 120 seconds. The plaques were superior to those from Thermoplastic A. No warpage was observed. Shrinkage control was adequate. The plaques had a very dull surface and visible glass print. With difficulty a LORIA surface quality measurement was made for that portion of the plaque where a surface reflection could be obtained. (Table 3). This measurement (151) is significantly poorer than that using low profile additive #4 (111). It was very difficult to obtain and should be considered a best case value for Thermoplastic B.

The following Table 3 reports a comparison of terephthalic acid-containing low profile additives #4 and #5 from Table 2 in a base resin containing terephthalic acid from recycled polyethylene terephthalate polymer.

Table 3 also reports the comparative tests with U.S. Pat. No. 4,054,561 Examples A and B.

TABLE 3

Recycle Low Profile Additives in PET Recycle Base Resin

| Formulation | 1 | 2 | 3 | 4 |
|---|---|---|---|---|
| Ashland Envirez 8030 Resin | 57.5 | 57.5 | 57.5 | 57.5 |
| Styrene | 10.5 | 10.5 | 10.5 | 10.5 |
| low profile additive #5 | 32.0 | — | — | — |
| low profile additive #4 | — | 32.0 | — | — |
| Thermoplastic A | — | — | 32.0 | — |
| Thermoplastic B | — | — | — | 32.0 |
| 12% Cobalt cure accelerator | 0.1 | 0.1 | 0.1 | 0.1 |
| 1,4-Benzoquinone Inhibitor 10% in Dowenol | 0.42 | 0.42 | 0.42 | 0.42 |
| Lupersol PDO Catalyst T-butyl Peroxy-2-ethylhexanoate | 0.27 | 0.27 | 0.27 | 0.27 |
| TBPB Catalyst, tertiary butyl perbenzoate | 1.5 | 1.5 | 1.5 | 1.5 |
| Zinc Stearate | 4.5 | 4.5 | 4.5 | 4.5 |
| CaCo$_3$ filler | 190 | 190 | 190 | 190 |
| B-Side (33% MgO dispersion) | 2.4 | 2.4 | 2.4 | 2.4 |
| Ashland Index | 100 | 111 | n/a** | 151 |

**Plaques were of such poor surface quality, the LORIA unit could not analyze the surface.

The data in Table 3 show that good results were reached using a mixture of ethylene glycol and diethylene glycol (symmetrical glycols) (#4) and using a mixture of ethylene glycol and 2-methyl 1,3 propanediol (asymmetrical glycol) (#5). Superior surface results were obtained using the asymmetrical glycol (#5).

Table 3 shows the data obtained with the U.S. Pat. No. 4,054,561 dimer acid-trimer acid. Ashland Surface Quality Index was 151 compared with the surface quality of 100 or 111 from the diethylene glycol/recycle PET low profile additive and asymmetric glycol/recycle PET low profile additive of this invention. This change in surface quality from 151 to 100 or 111 is a substantial improvement in the low profile property of the saturated polyester additive of this invention over the low profile additive of the reference.

I claim:

1. An epoxy-linked saturated polyester surface quality additive for use with unsaturated polyester and monomer, having 6,000 to 16,000 number average molecular weight (Mn) comprising the reaction product of
   a) saturated aliphatic diacid, diester, or anhydride having fewer than 12 carbon atoms, and
   b) oligomeric glycol having greater than 50 per cent recycle content prepared by adding 2-methyl 1,3 propane diol or diethylene glycol to recycled polyethylene terephthalate polymer, and heating to 150 to 250 degrees C. to transesterify said polyethylene terephthalate
   c) further linked by adding multifunctional epoxy compound.

2. A method of making an epoxy-linked saturated polyester surface quality additive prepared by heating recycled polyethylene terephthalate polymer with 2-methyl 1,3 propane diol or diethylene glycol, and a first portion of aliphatic diacid, diester, or anhydride having fewer than 12 carbon atoms, dissolving said polymer, heating to remove water, reaching homogeneous oligomer formation, adding a second portion of aliphatic acid having fewer than 12 carbon atoms, heating to 230 degrees C., reaching 3000 to 10,000 number average molecular weight (Mn), and further reacting by adding multifunctional epoxy, forming a 6000–10,000 Mn linked polyester.

* * * * *